April 25, 1933.  R. C. PALMER ET AL  1,905,493
PROCESS OF PURIFYING ROSIN
Filed Jan. 27, 1930
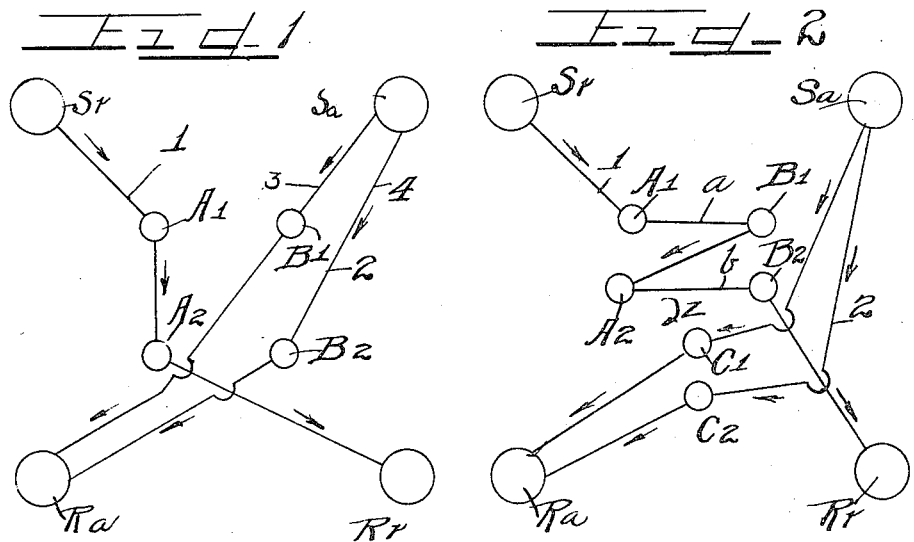
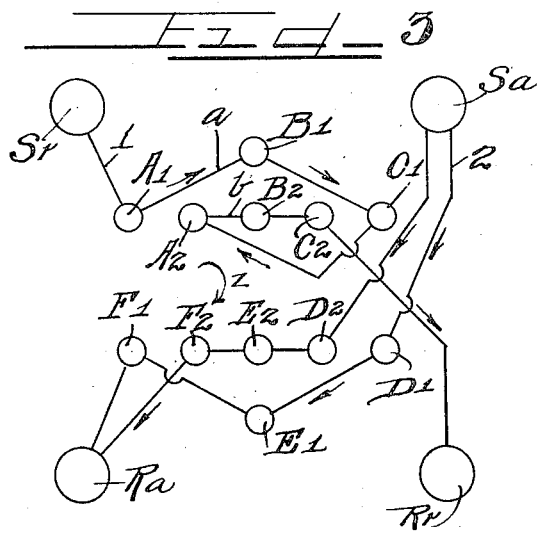
Inventors.
Robert C. Palmer.
John L. Burda
Anthony F. Oliver.
by Charles Mills Attys.

Patented Apr. 25, 1933

1,905,493

UNITED STATES PATENT OFFICE

ROBERT C. PALMER, JOHN L. BURDA, AND ANTHONY F. OLIVER, OF PENSACOLA, FLORIDA, ASSIGNORS, BY MESNE ASSIGNMENTS, TO NEWPORT INDUSTRIES, INC., A CORPORATION OF DELAWARE

PROCESS OF PURIFYING ROSIN

Application filed January 27, 1930. Serial No. 423,598.

This invention relates to the purification of rosin, more particularly wood rosin by means of fuller's earth.

The problem of purifying rosin, especially wood rosin, has occupied the minds of various experts in the art for a score of years. Rosin, particularly that extracted from the stumps of trees or chipped wood, and known as wood rosin, contains a considerable amount of impurities which impart to the rosin a dark color, thus making it unfit for use in the sizing of paper or in the manufacture of soaps. Various methods have heretofore been proposed to purify wood rosin, but few of these have attained commercial success.

In Patents Nos. 1,505,438 and 1,559,399 attempts were made to purify rosin by filtering the rosin in molten state or in solution through fuller's earth. Of these patents, the earlier relates to wood rosin and the later one to gum rosin.

In spite of the simplicity of the fuller's earth method as compared to any of the methods heretofore suggested, such method has not, to the best of applicants' knowledge, found application on a commercial scale. The reason for this apparently resides in the fact that either the impurities in rosin are so abundant or the saturation point of fuller's earth for such impurities so so low that it requires a weight of fuller's earth two or three times that of a given weight of crude rosin, to bring the purity of the rosin up to a point of commercial utility. For instance, if a given sample of wood rosin, grade FF, is dissolved in a suitable solvent, such as petroleum naphtha, and passed through a bed of fuller's earth, the first runs of the filtrate contain rosin in a very pure form; but, as the quantity of solution filtered through the bed increases, the grade of rosin in the filtrate constantly decreases until finally a point is reached at which the filter bed is practically inoperative to extract further impurities. If the filtration is halted when the quantity of solution passed through the earth is such that its rosin content is one-half the weight of the fuller's earth in the filter bed, and if all the rosin in the filtrate is collected, as by evaporation of the solvent, the rosin thus obtained is of grade I. It is evident that any further filtration will yield filtrates containing rosin of a much poorer grade than I, thereby decreasing the average grade of the entire filtrate. Since grade I is practically the first grade of commercial merit after the crude rosin itself (FF), it is obvious that the fuller's earth cannot be used practically for filtering more than half its weight of rosin. This fact explains the commercial failure of the fuller's earth processes heretofore proposed.

The fuller's earth, after it has been saturated with rosin impurities, is not necessarily wasted. Processes of revivification have been suggested by means of which the earth may be cleansed of the adsorbed impurities and restored to substantially its original adsorbing capacity. Such a process, for instance, is described in the United States Patent No. 1,523,802, or in our U. S. Patent No. 1,794,537 granted March 3, 1931. However, such revivification step alone is not sufficient to render the fuller's earth process feasible, for, although the earth itself is not wasted, the labor involved in the revivification step, the materials employed, the labor and cost of recovery of such materials are clearly wasted each time the filter bed reaches its saturation point. It, therefore, follows that means must be devised to increase the adsorptive capacity of the earth to save the fuller's earth process from commercial failure.

It is accordingly an object of this invention to provide a new and improved process for purifying rosin by filtering the same through fuller's earth.

It is a further object of this invention to provide for the cyclic operation of a fuller's earth process for purifying rosin.

Other, further and important objects or this invention will become apparent from the following description and appended claims.

We have now found that, if a bed of fuller's earth saturated with impurities to a point where the filtrate gives a rosin of a grade inferior to a certain one specifically named, be coupled in series with a fresh bed, that is, one just revivified, the adsorptive capacity of the system is greater than that of the fresh bed alone. Thus, if a quantity of rosin solution be passed through the system, the filtrate yields a grade of rosin far superior to that which would be obtained by passing the same quantity of rosin solution through fuller's earth.

To illustrate more concretely: if, using a fresh filter A containing a weight of fuller's earth equal to W, a petroleum naphtha solution of crude rosin of grade F be passed through the filter A until a weight of rosin equal to ½ W has passed through the filter, the rosin isolated from the filtrate has an average grade of I. It is obvious that the last cuts or fractions of filtrate contain rosin of a grade far inferior to I and further filtration through filter A would only serve to depreciate the average grade of the rosin obtained. However, if this partially exhausted or saturated filter A be connected in series with a fresh filter B of equal weight W, and another quantity of rosin (equal to ½ W) in solution be passed through the system in the order A—B, the resultant filtrate yields a rosin of grade K+, which is over one grade finer than grade I. Again, if the system A—B, after the aforementioned filtration, be connected in series with a fresh, third filter C, of weight W, and a quantity of rosin solution containing a weight of rosin equal to ½ W be passed through the new system in the order A—B—C, the resultant filtrate yields a rosin of purity N, which is three grades finer than grade I. This idea may be extended further, if desired.

If the three filters A, B, C, are now revivified by a process which permits collection of the impurities, as by the process described in our U. S. Letters Patent No. 1,794,537, it will be found that filter A, through which 3/2 W parts of rosin were passed, gives up 0.085 W parts of impurities; filter B, through which W parts of rosin were passed, yields 0.065 W parts of impurities; filter C, which had come in contact with only ½ W parts of rosin, gives up 0.055 W parts of impurities. It is thus seen that a filter bed will continue to extract color or impurities from rosin even after it has reached the saturation point with respect to a given grade. Furthermore, these additional impurities add up with the impurities subsequently extracted by a fresh bed to carry the grade of the rosin treated by the two beds farther than it would reach if the fresh bed were used alone.

In regard to the results produced by this method, it is interesting to observe that if, after coupling the partially exhausted beds with a fresh bed, as above stated, a solution of rosin be passed through the system in the order C—B—A, or B—A, respectively, that is, in such a manner that the rosin comes in contact first with the fresh filter and then with the partially exhausted filters in the order of their exhaustion, the improved grade does not result. On the contrary, the final grade is inferior to grade I, the grade which the fresh filter alone might have yielded.

The above process should, therefore, in practice, be made cyclic; that is, a number of filter beds should be arranged in a cycle whereby a certain number of them would constantly be used for filtering while a certain other number are being revivified, both the processes of filtering and revivification being carried out continuously without substantial interruption. For instance, in the concrete illustration given above, filter A and filter B should be connected in series for filtration, and filter C connected in the revivification circuit. After passing a certain amount of rosin solution through the system A—B while filter C was being revivified, filter A should be disconnected from the filtering circuit, filter B should occupy the position in the filtering circuit formerly occupied by filter A, and filter C that formerly occupied by filter B. Filter A should then be connected in the revivification circuit and revivified while rosin solution is being filtered through the new filtering system B—C. After such filtration, filter B should be cut out of the filtering circuit and connected in the revivification circuit, while revivified filter A should be connected in at the exit end of the filtering circuit. This procedure could then be carried on indefinitely.

In carrying out this process, however, we have made the further discovery that, if the rosin solution is allowed to issue ultimately from a filter which had at any time previously served at the inlet end of the filtering cycle, the resulting rosin is considerably inferior to that obtained by a cycle in which the final filter is one which had never before initially come into contact with the crude rosin solution. The reason for this action is not known, and, hence, we are not prepared to explain it. However, for the purpose of getting a clear picture of this effect, one may imagine that the crude rosin solution contains an impurity $p$, which has the following properties: first, it is one of the earliest impurities to adhere to the earth; second, it has an inhibiting effect on the adsorptive powers of the earth for a second impurity $q$; third, it adheres to the earth so tenaciously that subsequent revivification will not completely wash it away.

In view of this fact, the use of the above simple arrangement is not productive of the best results. Thus, considering the above arrangement, it will be noted that two filtrations or shifts subsequent to the initial condition indicated as A—B, the filtering system will contain the beds C—A, the bed B being under revivification; and, in this arrangement, the rosin solution will finally emerge from filter A, which originally was the first filter to come in contact with the crude rosin solution. In fact, in every filtration or shift thereafter, the bed at the exit end of the circuit will necessarily be one which two shifts earlier had been at the inlet end of the circuit.

In order, therefore, to satisfy both conditions, namely, first that each filter be used for a second or third filtration or shift to assist a filter acting for its first filtration or shift, and, secondly, that a filter which has been directly connected to the rosin supply should not be thereafter connected directly to the rosin receiver, we have found it necessary to devise a system as described below and illustrated in the accompanying drawing, especially in Figures 2 and 3.

Referring now to the drawing:

Figure 1 indicates one embodiment of a schematic arrangement for carrying out our process.

Figure 2 an embodiment of a different schematic arrangement.

Figure 3 an embodiment of a third schematic arrangement.

The filtering circuit disclosed in Figure 1, indicated generally by the reference numeral 1, comprises the crude rosin solution supply tank $S_r$, the fresh or revivified filter units $A_1$, $A_2$, and the rosin solution or filtrate receiver $R_r$, all connected in series, with unit $A_1$ adjacent the tank $S_r$ and unit $A_2$ adjacent the receiver $R_r$. Operating in conjunction with the filtering circuit is the revivifying circuit, indicated as at 2, and comprising the revivifying solvent supply tank $S_a$, the filtering units $B_1$, $B_2$ to be revivified, and the revivifying liquid receiving tank $R_a$, said elements being connected in parallel whereby the liquid from tank $S_a$ passed in two separate streams 3 and 4 through the filtering units $B_1$ and $B_2$ to the common receiver $R_a$.

As is apparent, the manipulation of this system consists in filtering rosin solution from tank $S_r$ through the filters $A_1$ and $A_2$ to the receiving tank $R_r$, and simultaneously passing the revivifying solvent from tank $S_a$ through the filters $B_1$ and $B_2$. Filters $A_1$ and $A_2$ are then cut out from the filtering circuit and filters $B_1$ and $B_2$ cut in, care being taken that filter $B_2$ occupies the position formerly occupied by filter $A_2$. Filters $A_1$ and $A_2$ are connected in the revivifying circuit in the places of filters $B_1$ and $B_2$, respectively, and revivified at the same time that rosin solution is filtered through filters $B_1$ and $B_2$.

This method is alternative and meets the condition that the filter at the exit end of the circuit should be one that has never previously been used at the inlet end, but does not provide for the step-by-step advancement of the filters in the filtering circuit so that a fresh filter is always aiding a filter containing adsorbed impurities or a partially saturated filter. For this reason, the systems of Figures 2 and 3, which embody both of the above conditions, are preferable, especially in commercial practice.

In the system disclosed in Figure 2, two groups of filters $a$ and $b$ composed of filters $A_1$, $B_1$ and $C_1$ and $A_2$, $B_2$ and $C_2$, respectively, are employed. At any instant, two units of each group are connected in series with each other and with a rosin solution supply tank $S_r$ and a filtrate receiver $R_r$ to constitute a filtering circuit, while, at the same time, one unit of each group is connected in parallel with a revivifying solution supply tank $S_a$ and the revivifying solution receiver $R_a$ to constitute the revivifying circuit. As here indicated, the filtering circuit 1 contains fresh or revivified filters $A_1$, $B_1$, $A_2$, $B_2$ and the revivifying circuit contains the saturated filters $C_1$ and $C_2$.

In operation, the impure rosin solution is made to pass first through the filters $A_1$, $B_1$, $A_2$, $B_2$ in the order named. After one filtration or one shift, the unit $A_1$ from the first group is eliminated and put under revivification, while unit $C_1$ is introduced at the exit end of the filtering circuit. At the same time unit $A_2$ of the second group $b$ is cut out of the filtering circuit and put under revivification, and unit $C_2$ cut in at the exit end of the filtering circuit. After another filtration or shift, the filtering circuit is made to consist of units $C_1$, $A_1$, $C_2$, $A_2$, while units $B_1$ and $B_2$ are being revivified. Thus each group, in itself, undergoes a cyclic movement similar to that of the entire system, rotation being in the direction of the arrow Z. At the same time, the parallel arrangement of the revivification circuit is maintained.

By this system, the first rule is satisfied, because each filter unit operates for two shifts, the fresh unit always being at the exit end of each filtering circuit. The second rule is satisfied because the receiver $R_r$ is always in contact with filter units of the second group only, and the supply tank $S_r$ is always in direct contact with units of the first group.

Of course, Figure 2 represents merely the simplest system satisfying the above two rules. In practice, many variations and extensions are possible, as, for instance, instead of two groups in a battery of filter units, three or more may be used. Instead of two units of each group being employed in each filtering cycle, three or more may be employed, each filter unit thus being made to perform three or more shifts between revivification. Similarly, the number of units from each group which are being revivified may be more than one. Furthermore, while each unit is shown as consisting of but a single filter tower or bed, it is clear that the unit may be made to comprise a group of tower beds connected in series or in parallel or both in series and parallel relationship. The characteristics of a unit will then be that the individual towers within each unit are substantially alike with respect to the amount of rosin solution with which they have come into contact since the last revivification, and hence with respect to the quantity and quality of impurities contained therein at a given instant while towers in different units will differ in these respects.

In Figure 3 we have illustrated a system containing certain of the variations indicated above. This system consists of a filtering circuit illustrated generally as at 1 and a revivification circuit indicated generally at 2. In these circuits, two separate filter groups $a$ and $b$ are employed, each group containing six filter units A, B, C, D, E and F, the filtering circuit employing three units in each group and the revivifying circuit three units. As shown, the units $A_1$, $B_1$, $C_1$, $A_2$, $B_2$ and $C_2$ are connected in series to the impure rosin solution supply tank $S_r$ and the rosin solution receiving tank $R_r$ to form the filtering circuit. Units $D_1$, $E_1$, $F_1$, $D_2$, $E_2$ and $F_2$ are connected in series and parallel arrangement with a revivifying solvent supply tank $S_a$ and a receiving tank $R_a$ to constitute the revivifying circuit. The operation of this system is cyclic and similar to that disclosed in Figure 2.

It will, of course, be understood that, although the drawing discloses the filtering units as arranged in a circle, this does not limit the actual arrangement in practice, as the latter is determined by the availability of space, ease of access, practicability of piping designs and the like. Similarly, the number and spacing of the supply tanks or receiving tanks may vary considerably to suit convenience and economy.

By the use of a cyclic arrangement, observing the two rules above mentioned, we have succeeded in putting the fuller's earth method of purifying rosin into commercial operation.

It should, of course, be understood that, while we have described our invention specifically in connection with wood rosin, the same is applicable to gum rosin as well. Again, we have used the words fuller's earth throughout but other adsorbent materials which are capable of purifying rosin may be used without loss of the main advantages of our invention.

We claim as our invention:

1. The process of purifying rosin which comprises forming a plurality of separate groups of adsorbent filter beds from beds of varying purities, arranging the beds in each group in series and in a descending order from the inlet end of each group according to the amount of impurities adsorbed on each bed, connecting the groups in series with the group having the most impure beds at the inlet end of the series and that having the freshest beds at the exit of the series, passing an impure rosin solution through the series of filters, cutting out the most saturated filter from each group, advancing each filter one position in each group, inserting a fresh or revivified filter at the exit end of each group and passing further quantities of impure rosin solution through the new series of filters.

2. The process of purifying rosin which comprises forming a plurality of groups of adsorbent filter beds from beds of varying purities, arranging the beds in each group in series and in a descending order from the inlet end of each group according to the amount of rosin impurities adsorbed on each filter, connecting the separate groups in series with the group having the most impure beds at the inlet of the cycle and the group having the freshest beds at the exit end of the cycle to form a filtering circuit, arranging other saturated filter beds in parallel to form a revivifying circuit, passing an impure rosin solution through the filtering circuit and at the same time a revivifying solution through the revivification circuit, cutting out the most saturated bed from each group of filters, advancing each filter one position in each group, inserting a revivified filter bed from the revivifying circuit in each group at the exit end thereof, placing said saturated filters from the filtering circuit in the revivifying circuit and passing further quantities of impure rosin solution through the filtering circuit and revivifying solution through the revivifying circuit.

3. A cyclic process for purifying rosin which comprises arranging a plurality of filter beds in series and in descending order from the inlet end of said series according to the amount of impurities adsorbed thereon to form a filtering circuit, the bed at the exit end of said circuit never previously having been used as the inlet of the same, arranging other adsorbent filter beds in a revivification circuit, passing a rosin solution through said filtering circuit and at the same time passing a revivifying liquid through said revivifying circuit and subsequently replacing the most impure of said beds in said filtering circuit by a bed from said revivifying circuit.

4. The process of purifying rosin which comprises connecting a plurality of adsorbent filter beds to form a plurality of groups, one of said groups containing only filter beds which have not previously been the first to contact a crude rosin solution, connecting said groups in series with the one group at the exit end of the same, arranging other filter beds in a revivifying circuit, passing rosin solution through said filtering circuit and a revivifying liquid through said revivifying circuit and cutting out corresponding spent filter beds in each group from the filtering circuit, connecting the same in the revivifying circuit and inserting fresh filter beds from the revivifying circuit in each group at the exit end of the same.

5. The process of purifying rosin which comprises arranging a plurality of adsorbent filter beds in groups and in descending order from the inlet end of each group according to the purity of each filter bed to form a plurality of separate groups, connecting the groups in series to form a filtering circuit, the group at the exit end of the circuit containing only filters which have not previously been the first to contact a crude rosin solution, and passing an impure rosin solution through said filtering circuit to remove impurities therefrom.

6. The process of purifying rosin, which comprises connecting a plurality of separate groups of adsorbent filter beds in series to form a filtering circuit, with the group at the exit end of the circuit containing only filter beds not previously used in the group at the inlet end of the circuit, passing an impure rosin solution through said filtering circuit, cutting out from each group the filter bed at the inlet end thereof, advancing each filter bed one position in each group, inserting a fresh filter bed at the exit end of each group but always maintaining the same type of filter beds in the exit group, and passing a further quantity of rosin solution through said circuit.

7. The process of purifying rosin which comprises arranging a plurality of groups of filter bed units in series to form a filtering circuit with the exit group containing only units not previously used in the inlet group, connecting a plurality of filter units in parallel in a revivifying circuit, filtering an impure rosin solution through said filtering circuit, cutting out from each group in said filtering circuit the filter unit at the inlet end thereof, inserting at the exit end of each group a unit from the revivifying circuit, but always maintaining the same character of units in the exit group, connecting the units cut out of the filtering circuit in the revivifying circuit and passing further quantities of impure rosin solution and revivifying solvent through the filtering and revivifying circuits, respectively.

In testimony whereof, we have hereunto subscribed our names at Pensacola, Escambia County, Florida.

ROBERT C. PALMER.
JOHN L. BURDA.
ANTHONY F. OLIVER.